Dec. 16, 1969  F. L. HENINGER ET AL  3,483,786
PERCUSSION MUSIC TEACHING INSTRUMENT.
Filed June 10, 1968  2 Sheets-Sheet 1

INVENTORS
ORMON R. WEIGHT
FRANCINE L. HENINGER
BY
ATTORNEY

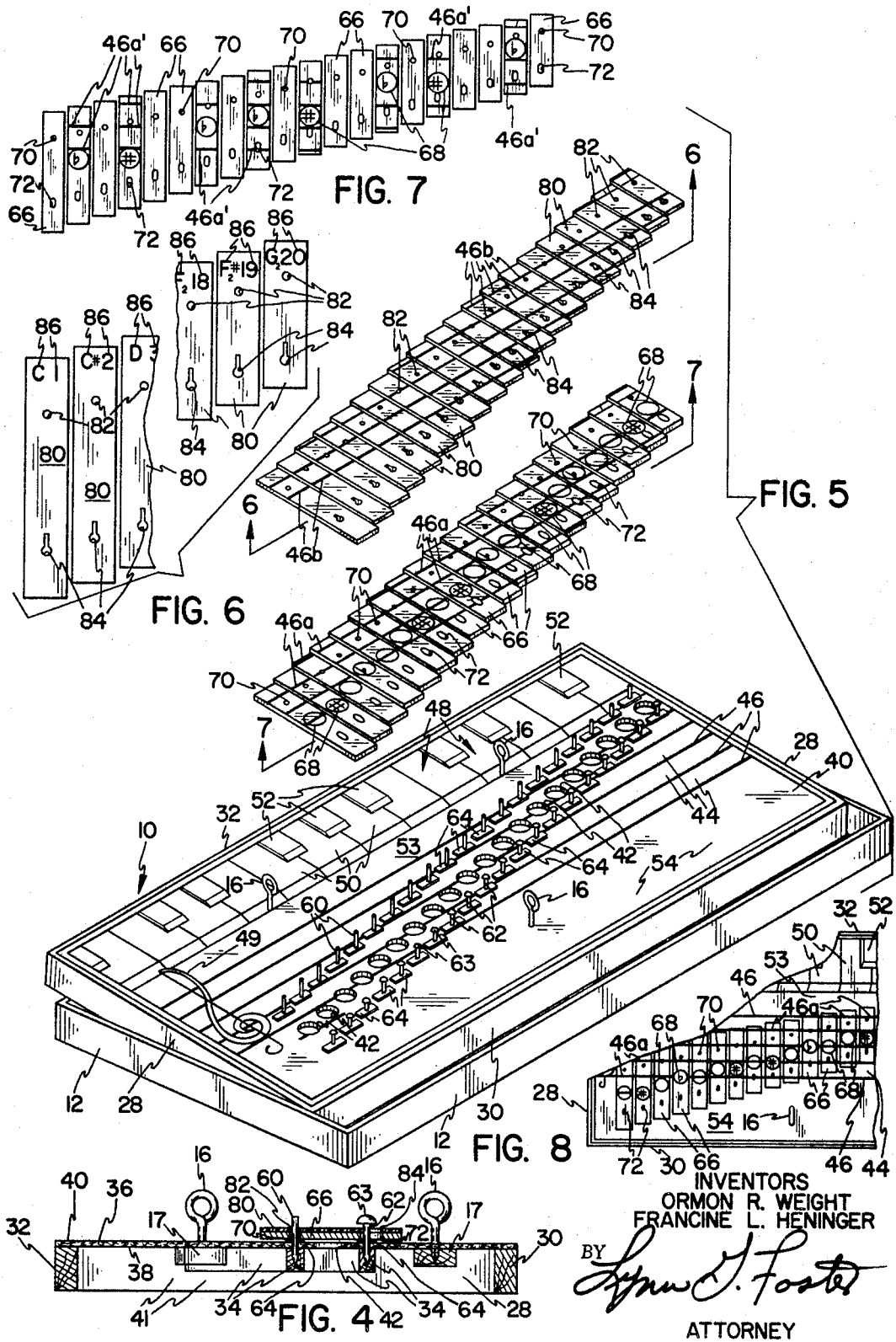

United States Patent Office 3,483,786
Patented Dec. 16, 1969

3,483,786
PERCUSSION MUSIC TEACHING INSTRUMENT
Francine L. Heninger, 4248 Sunset View Drive, and Ormon R. Weight, 2520 Lincoln Lane, both of Salt Lake City, Utah 84117
Filed June 10, 1968, Ser. No. 735,859
Int. Cl. G09b *15/00;* G10d *13/08*
U.S. Cl. 84—470                                    11 Claims

ABSTRACT OF THE DISCLOSURE

A compact percussion music teaching instrument comprising a series of pin-retained, tuned sounding metal bars, for sounding notes in a chromatic scale comprising one and one-half octaves, each bar displaying in proper staff location the symbol of the note which identifies the tone produced by sounding the bar and at least one staff line. Each bar is centrally superimposed over an aperture in a board which aperture is in communication with a resonance chamber, the bar also surmounting a staff of lines displayed on the board. The board also displays a piano keyboard representation, the keys of which correspond to and are respectively aligned with the notes of the scale shown on the bars. A cover plate with at least one staff line but no note symbol is available to be superimposed over and protect each bar during non-use. The letter designation on the cover plate of each note on the staff depicted on the bars may be shown adjacent to the appropriate bar during use, for example when the cover plate therefor is inverted near the bar to display the letter designation. Also, certain bars may be inverted to display a sharp or flat note so that the flat or sharp equivalent thereof, which appears on the reverse side of the bar, is visually illustrated as desired. Thus, the student may by simultaneous audio, visual and tactile exposure learn the letter designation, the staff location, the piano keyboard location as well as the relative sound of each note on the scale.

---

The present invention relates to an entertaining and educational percussion musical instrument and more particularly to a music teaching instrument designed to accelerate the process of learning to read music by reliance on the sight, hearing and touch senses and to allow a teacher with limited musical background to better teach the subject.

The present invention aids the student in learning to read music through eye, ear and touch training, necessitating personal involvement or participation by the student in the playing of the instrument. The invention in its presently preferred form comprises a percussion instrument of the xylophone type for teaching one to read music and comprises a series of tuned metal bars which when struck by a mallet respectively produce a tone corresponding to the note symbol displayed on the bar so vibrated. The sounds produced by striking the bars successively comprise a scale of notes of known range. The bars are superimposed over a board and each bar surmounts an aperture therein which provides for communication of bar-originated vibrations from the bar to a concealed resonance chamber behind the board. Together the board and series of bars present to the eye the image of a staff of lines which is continuous such that the staff location of each note symbol on a given bar is readily apparent. The bars are restrained against inadvertent lateral movement, for example by use of pins projecting from the board and through apertures in the bars, and each bar is supported upon cushioned pedestals, such as felt pads. Each pin is surrounded by electronic tubing of heat shrinkage plastic or other material which isolates the nail from the vibrations of the bar so that proper vibration of each bar following impact by the mallet will be obtained when the board is lying flat or in some other position.

Desirably, the face of the board also displays a piano keyboard representation with the keys corresponding to and aligned with the notes on the bars, and the letter designation of each depicted note may be visually displayed during use of the instrument to aid the student in learning to read and understand music. It is helpful for comprehensive teaching that provision has been made for the inversion of bars symbolically illustrating on the top face either a sharp or flat note so that the flat or sharp equivalent thereof, which appears on the reverse side of the bar, may be visually illustrated as desired.

Preferably, flexible plastic or like shape-retaining cover plates are provided and adapted to fit over each musical bar to allow disclosure of only one or more notes at one time, to protect the musical bars when the instrument is not being used, and to secure the bars tightly in position during times when the instrument is being transported from one place to another. The back side of each cover plate may also display information helpful in teaching the student to read music.

With the foregoing in mind, it is a primary object of the present invention to provide a novel percussion musical instrument for teaching students to read music.

It is a further significant object of the present invention to provide a self-contained novel instrument for teaching the student of music, through use of more than one sense, the sound or pitch of selected notes and various ways in which such notes are located and/or designated.

It is another important object of the present invention to provide a relatively economical, portable and durable music training instrument which allows the student to learn to read music through visual, audio and tactile exposure to the subject.

These and other objects and features of the present invention will become more fully apparent from the following description and appended claims taken in conjunction with the accompanying drawings wherein:

FIGURE 4 is a cross-sectional view of the instrument taken along line 4—4 of FIGURE 2;

FIGURE 5 is an exploded perspective representation of the instrument with the lid removed and inverted so as to receive the instrument as illustrated for improved resonance;

FIGURE 6 is an enlarged fragmentary bottom plan view of the underside of the flexible cover plates of the instrument taken along line 6—6 of FIGURE 5;

FIGURE 7 is a bottom plan view of the tuned metal sounding bars of the instrument taken along line 7—7 of FIGURE 5; and FIGURE 8 is a reduced fragmentary plan view of the instrument with the cover plates removed and the soundbars exposed.

Figure 1:
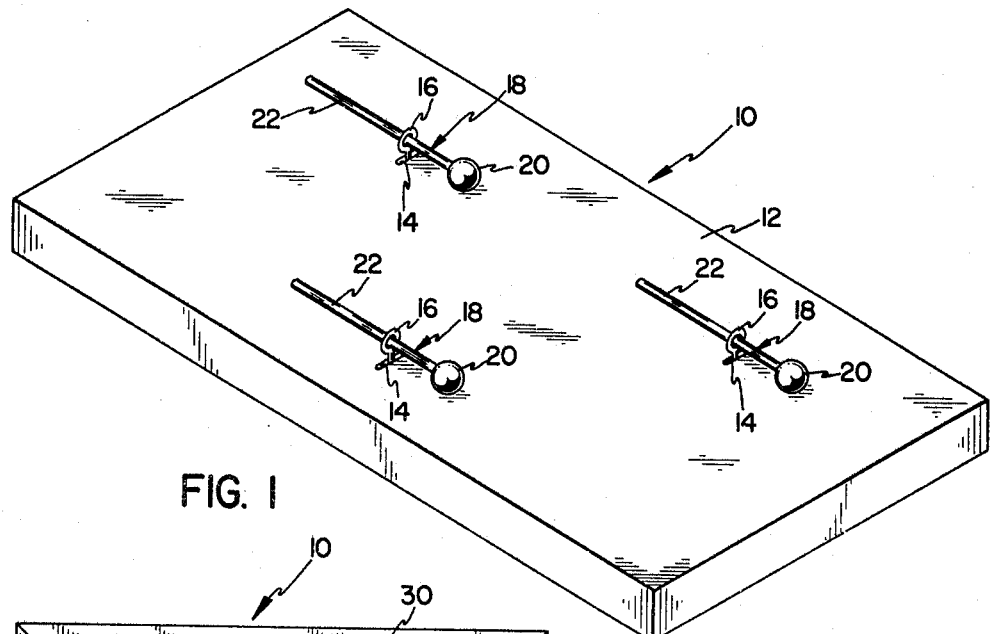
FIGURE 1 is a perspective representation of the presently preferred embodiment of this invention concealed across the top along the edges thereof by a lid secured in position by eyescrews and mallets.
Figure 3:
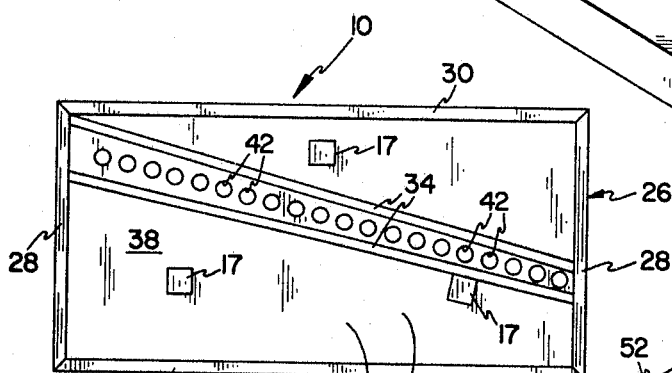
FIGURE 3 is a reduced-size bottom plan view of the instrument of FIGURE 1 taken along line 3—3 of FIGURE 2.

Specific reference is now made to the figures wherein like numerals are used to designate like parts throughout. FIGURE 1 illustrates in perspective a percussion instrument 10, according to the present invention, which is concealed along the top and edges by a lid 12, formed in a conventional way of cardboard or other suitable material. The lid 12 is illustrated as having three spaced slots or holes 14 through which an eyescrew 16 projects, when the instrument is not being used and the lid is in the position illustrated in FIGURE 1. Each eyescrew 16 is secured to the instrument by a threaded union with a concealed wooden or like block 17, as illustrated in FIGURES 3 and 4.

Mallets or hammers, used to strike sounding bars in playing the instrument, are illustrated in FIGURE 1 as securing the lid in its closed position with the handle 22 of each mallet 18 passing through the eye of one eyescrew 16 so that the proximal end of the handle 22 firmly engages the top of the lid 12 as does the head 20 of the mallet. The illustrated head 20 is of reasonably hard material, such as plastic or rubber, and is press-fit upon the distal end of the handle 22.

The lid 12 may be removed from the instrument by pulling the mallets 18 from the eyes of the screws 16 and lifting the lid. Although FIGURE 1 shows the lid secured in position by eyescrews and mallets, it is contemplated that any practical method of holding the lid firmly in place may be used.

During use of the instrument, the lid 12 may be inverted and used, if desired, to receive the bottom of the instrument with or without the bottom of the instrument resting on one edge of the lid, as shown in FIGURE 5, so that the lid in essence forms the bottom of the resonance chamber of the instrument. When the instrument is so disposed upon one edge of the inverted lid, a slightly larger resonating cavity is formed.

As can be appreciated by observation of the figures, the illustrated instrument 10 is very compact and portable and designed to be used on top of a desk, table or the like, or may be hung vertically or so placed on the desk top, table or the like by the teacher so as to make it possible for the teach to illustrate its use to the students more advantageously.

Instrument 10, as best illustrated in FIGURES 3 and 4, comprises a rectangular peripheral frame, generally designated 26, consisting of two side members 28, bottom frame member 30 and top frame member 32. The frame 26 is preferably comprised of wood, although other suitable materials could be used for economic or other reasons.

The entire peripheral frame 26 is covered along the top edge thereof by a board 36, fabricated from commercially available pressed fibrous material, plastic or the like. The board 36 is secured to the top edge of the peripheral frame 26, which it entirely covers, by suitable bonding agent or by conventional fastening techniques (not shown).

With reference again to FIGURES 3 and 4, a pair of diagonal frame members 34 span between the side members 28 diagonally across the underside 38 of the board 36 with the upper surface of each member 34 in contiguous relation with the lower surface 38 of the board. Preferably, the end edges of the diagonal frame members 34 are respectively bonded or otherwise suitably fastened to the contiguous side member 28. The space bounded by the board 36 and within the peripheral frame 26 comprises a resonance chamber 41. The space between the diagonal frame members 34, where vibrations enter the resonance chamber 41, communicate directly with the remainder of the resonance chamber 41 beneath the bottom edge of the diagonal members 34, the members 34 having a depth considerably less than the depth of the members 28, 30 and 32 of the peripheral frame 26.

A series of apertures 42 are provided in the board 36, each aperture being directed transverse to the plane containing the board 36. An imaginary line joining the locus of centers of the apertures 42 is disposed diagonally across the board. The apertures 42 of course provide for communication of vibrations to the resonance chamber 41, the vibrations originating from metal sounding bars, to be later described.

The relatively thin board 36 comprises a top surface 40 (FIGURE 4) which displays musical indicia for aiding the student in learning to read music. Specifically, the top surface 40 centrally displays a five-line staff comprising bold lines 46, preferably black in color separated by spaces 44, preferably white in color. The lines 46 of the staff are broken only by the diagonal array of apertures 42. A treble clef 49 is superimposed at the left (FIGURES 2 and 5) over the staff; however, the alto or bass clef signs (not shown) may also be used in lieu of the treble clef.

Desirably, the shaft of lines is bounded by a bottom border 54, of some suitable color, such as blue, so as to be in contrast with the white spaces 44 and the black lines 46, and by the top border 53, also of some contrasting color.

A representation 48 (FIGURES 2 and 5) of part of a piano keyboard is also displayed upon the top surface 40 of the board 36. The location of the white key notations 50 and the black key notations 52 are selected to correspond with the sound produced by striking the most immediately adjacent metal sounding bar.

A generally diagonally disposed array of pins 60 is situated to one side of the diagonal array of apertures 42, the pins 60 in the illustrated embodiment comprising headless finishing nails driven respectively through the board 36 into one diagonal frame member 34 (see FIGURE 4) so that the exposed portion thereof projects from the board in a generally vertical direction when the instrument is generally horizontal. However, it is contemplated that any satisfactory material may be used for pin 60. Likewise, a generally diagonally disposed array of pins 62 is also anchored to the board immediately to the other side of the diagonal array of apertures 42. However, it is contemplated that any satisfactory material may be used for pin 62. In the illustrated embodiment (see FIGURE 4), the pins 62 comprise nails respectively driven through the board 36 into the other diagonal frame member 34 so as to present a vertically extending shaft terminating in an enlarged head 63. One pin 60 and one pin 62 are laterally aligned with each other and with the immediately adjacent aperture 42 so that a line connecting the respective center lines thereof will be generally parallel to the side-edge of the instrument.

A cushioning pedestal 64, preferably a felt pad, encircles each pin 60 and 62 and rests upon the top surface 40 of the board 36. See especially FIGURE 5.

A series of twenty tuned metal sounding bars 66 of varying lengths is centrally illustrated in exploded perspective in FIGURE 5. The metal is preferably steel and desirably all exposed surfaces of each bar are coated, as by painting or the like. The metal bars 66, when sounded successively, produce a chromatic scale of tones (from C to G—one and one-half octaves). However, it is contemplated that there may be also more or less than one and one-half octaves, as desired. Each bar represents a specific note in a chromatic series or within a specific range and when sounded produces the pitch of that note. Preferably, the bars are respectively disposed by force of gravity upon spaced cushioning pedestals 64 so as to span therebetween and allow each bar to vibrate freely during use. It is contemplated, however, that any other practical method may be used to accomplish this. Each bar surmounts one aperture 42 in the board 36. Each bar 66 in the assembled position is superimposed over at least part of the staff displayed on the top surface 40 of the board 36. In this position one headless nail 60 or its equivalent will project through an appropriately sized and located aperture 70. Each aperture 70 is illustrated as being circular in cross section. Likewise, one pin 62 extends through an elongated, somewhat eliptical aperture 72 in the adjacent bar 66. Thus, the bar is secured against inadvertent appreciable lateral displacement generally parallel to the plane containing the board 36, but can be removed from the pins by certain turning and lifting action.

The normally-exposed top surface of the bars 66, shown centrally in FIGURES 5 and 8, each display certain musical indicia for teaching the student to read music. Specifically, each bar displays a symbolic representation 68 of the note which identifies the tone produced when the bar is sounded shown in its proper scale or staff position. Sharp and flat notes are indicated by the usual symbols.

Each bar also displays at least one bold staff line 46a, which in the assembled position, is of the same color and width and is aligned immediately above one of the five staff lines 46 displayed on the top surface 40 of the board 36. Thus, in the assembled position (see FIGURE 8) the staff lines 46 and 46a viewed together in plan present to the eye of the student and teacher an image of five continuous staff lines.

The portion of each bar 66 appearing in the assembled position below the lower-most staff line 46a on the bar or above the upper-most staff line 46a on the bar is desirably pigmented to display a color corresponding to the adjacent border 53 or 54 of the board 36 over which the mentioned portion of the bar 66 is superimposed. Likewise, the portions of each bar 66 superimposed over the staff spaces 44 in the assembled position are pigmented white to present the same color as presented by the spaces 44.

Eight of the twenty illustrated metal bars 66 display notes accompanied by a sharp symbol (#) or a flat symbol (b). These notes relate to the black keys of a piano and are respectively aligned with a key symbol 52. The bars on which the sharp and flat symbols are displayed, at the top surface thereof, are reversible. With reference to FIGURE 7, which shows the reverse side of all of the bars 66, those bars which display a sharp symbol and note on the top surface thereof display the corresponding flat symbol and note in relation to the scale on the reverse side thereof. At least one bold staff line 46a' is also displayed on the reverse side of each of the eight bars. Thus, the mentioned eight bars may be reversed to more comprehensively teach the student to read music and to understand the equivalency of selected sharp and flat notes. When the mentioned eight bars are reversed and placed in the illustrated assembled relation, the mentioned continuity of staff lines 46, 46a and 46a' will be established so that a single staff of lines will appear to the eye of the observer when viewed in plan. As aforesaid, the portion of each of the mentioned eight bars appearing in the assembled position below the lower-most staff line 46a' on the bar or above the upper-most staff line 46a' on the bar is desirably pigmented to display the color corresponding to the color of the adjacent border 53 or 54 of the board 36 over which the mentioned portion of the cover plate is superimposed. The bold staff lines 46a' are preferably of the same color and width as the staff lines 46 and the portions of the mentioned eight bars superimposed over the staff spaces 44 are preferably pigmented white to match the color of spaces 44.

The other twelve bars, while being capable of being reversed, have no musical indicia on the reverse side. It is contemplated, however, that under certain conditions not herein described, use may be made thereof for instruction purposes.

Figure 2:
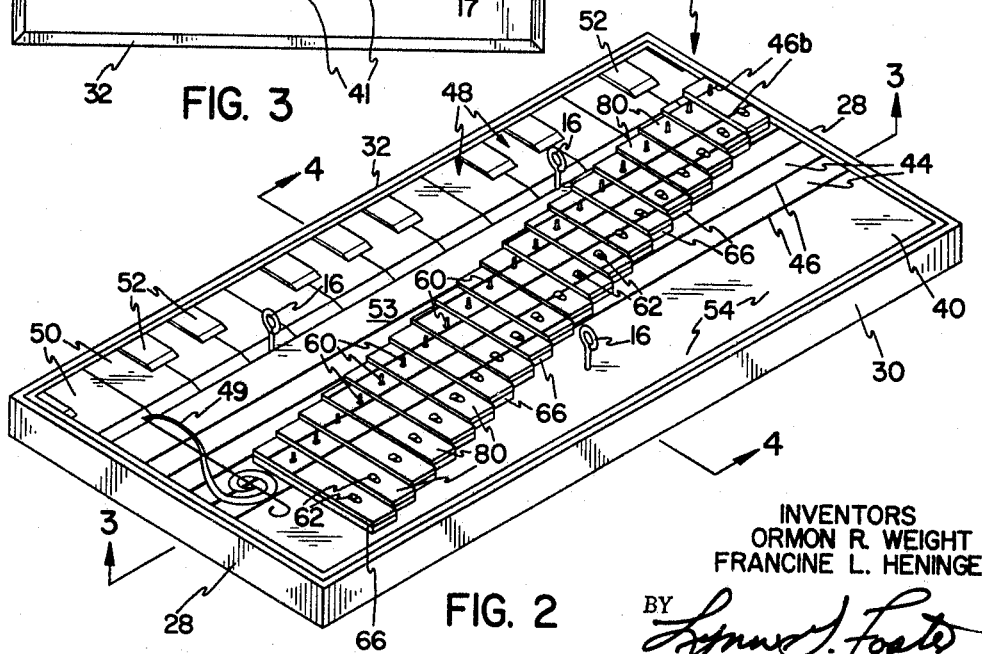
FIGURE 2 is another perspective representation of the presently preferred percussion music teaching instrument of FIGURE 1 with only the lid removed.

A plastic, cardboard, or like flexible cover plate 80 with some degree of a retentive memory is desirably provided for placement over each metal bar 66. With reference to FIGURE 2, each cover plate is sized to be superimposed over and completely conceal the top surface of the adjacent bars 66. Thus, the length of the cover plates 80 will differ one from another as the lengths of the various bars vary one from another. Each cover plate displays at least one staff line but no musical note symbol so that when only the cover plate and not the associate bar is visible, in plan, to an observer, the staff lines 46 of the board will appear to be continuous with the staff lines 46b of the cover plate so that a single image of a staff of lines will appear to the eye. When it is desired during teaching to disclose only one or more notes at a time and some bars are exposed to view and some bars concealed from view by cover plates 80, the five-line staff formed by lines 46a or 46a' of the bars, lines 46b of the cover plates and lines 46 of the staff displayed by the board will nevertheless appear in plan to be one continuous image.

As can be appreciated by reference to FIGURE 2, when a cover plate is in position on the instrument one pin 60 will project through an aperture 82 in the cover plate and one pin 62 will project through a keyhole-shaped aperture 84 in the cover plate. To place a cover in the assembled position over the appropriate bar, the larger portion of the keyhole aperture 84 is aligned with the head 63 of the appropriate pin 62 and the end of the cover plate 80 adjacent the keyhole aperture 84 is pressed downward against the bar 66. Thereafter, the cover 80 is laterally shifted until the head 63 is superimposed immediately above the narrow portion of the aperture 84 and the aperture 82 is in alignment with the pin 60. When the end of the cover plate 80 nearer the aperture 82 is brought into contiguous relation with the bar 66, the mounting of the cover plate will be completed and the cover plate will protect the bar when not being used and will tend to secure the bar upon the pins during times when the instrument is transported from place to place. To remove a cover plate the described procedure is reversed.

The portion of each cover plate 80 appearing in the assembled position below the lower-most staff line 46b of the cover plate or above the upper-most staff line 46b of the cover plate is desirably pigmented to display a color corresponding to the color of the adjacent border 53 or 54 of the board 36 over which that portion of the cover plate superimposed. Likewise, the bold staff lines 46b are preferably of the same color and width as the staff lines 46 and the portions of the cover plates superimposed over the staff spaces 44 in the assembled position are preferably pigmented white to present the same color as presented by the spaces 44.

In the illustrated embodiment, the reverse side of each cover plate 80 displays selected indicia designated by the numeral 86. This indicia consists of (a) the letter designation of the note produced when the bar covered by a given cover plate is sounded and (b) the left to right numerical location of a given cover plate relative to the other cover plates. Thus, the designation "C1" means the cover plate is adapted to fit over the bar which produces the note C and is the first cover plate in the series beginning at the left as illustrated in the figures. Of course, such letter designation may be displayed elsewhere on the instrument, if desired. Thus, when a given cover plate is removed it may be inverted and placed adjacent the bar from which it was removed so that the student may correlate the sound, the staff location, the piano keyboard location, and the letter designation of a selected musical note which, of course, requires utilization by the student of his senses of sight, hearing and touch. However, it should be fully understood that when the term "pitch," "tone," "sound" or some other similar expression is used herein, the actual sound produced by striking a particular bar with a mallet or hammer may or may not be precisely accurate as to pitch and it may be even an entire octave higher or lower than that which the note symbol on the staff may indicate. Nevertheless, as previously emphasized, the purpose of the invention will be well served in spite of this fact.

From the foregoing, it should be readily apparent that the main objective of the present invention is to aid the student in the process of learning to read and understand music through use of his senses of sight, touch and hearing. The student may count out loud, sing the names of the notes, or sing the words of the song as he is playing the instrument 10. Familiarity with the piano keyboard and with musical intervals is achieved, which is so important in singing and reading music.

Thus, the present instrument can provide a background of musical training that should increase the music potential of the average student, aid him in reading music aloud or in a group and prepare him for more specialized music training later.

A teacher with limited experience and knowledge of music may more comprehensively instruct students in music with a minimum time investment, individually or in groups where each student or each few students are provided with an instrument according to the present invention. Group interaction in this way may be a significant stimuli to the learning process.

Lessons may be presented in series and may be directed to such subjects as letter names of notes, counting, rhythm signatures and scales, intervals—both visual and audio, two part playing and singing, and piano keyboard relationship to notes.

The experience of playing the present instrument is pleasant, making the learning of music considerably more delightful than usual approaches.

The invention may be embodied in other specific forms without departing from the spirit or essential characteristics thereof. The present embodiment is, therefore, to be considered in all respects as illustrative and not restrictive.

What is claimed and desired to be secured by United States Letters Patent is:

1. In a percussion music teaching device, a visual display board forming part of a resonance chamber, a series of spaced apertures in the display board collectively forming an array diagonal of the board, a tuned sounding bar surmounting each aperture and supported upon cushioning pedestals so that vibrations caused by striking the bar will pass through the aperture into and sound within the resonance chamber, means restraining each bar against appreciable lateral movement relative to the board, each bar being superimposed at least in part over a staff of lines displayed on the board and each bar symbolically depicting in relation to the staff the one note identifying the tone which is produced when the bar is sounded and at least one staff line on the exposed surface thereof which staff line is in visual alignment with one of the staff lines on the board whereby the sound and staff location of musical notes may be simultaneously learned through joint use of the sight, hearing and tactile senses.

2. In a device according to claim 1 wherein the restraining means comprises pins anchored to the board and passing through spaced apertures in each bar.

3. In a device according to claim 1 further comprising a piano keyboard representation displayed on the board with the keys thereof respectively aligned with the corresponding symbolic note representations on the bars whereby the relation of sound, and staff and piano keyboard location of musical notes may be jointly learned through the sight, hearing and tactile senses.

4. In a device according to claim 1 further comprising means displaying the letter designation of each note identifying the tone produced by sounding the bars.

5. In a device according to claim 1 wherein selected bars having sharp and flat note designations each display the corresponding flat and sharp symbolic designation on the reverse side thereof along with at least one staff line whereby said selected bars may be inverted to more comprehensively instruct pupils.

6. In a device according to claim 1 wherein various portions of the board and bars are correspondingly colored differently to contrast the portions one with another.

7. In a device according to claim 1 further comprising a yieldable cover plate adapted to be superimposed over and thereby protect each bar when not in use, each cover plate displaying at least one staff line without a note symbol which in the assembled position is visually aligned with one staff line on the board whereby any number of the bars may be covered and uncovered as desired.

8. In a device according to claim 7 wherein said restraining means comprises pins anchored to the board and passing through aligned apertures in each superimposed cover plate and bar.

9. In a device according to claim 8 wherein one pin passing through each superimposed cover plate and bar has an enlarged head and the adjacent aperture in the cover plate is keyhole-shaped so as to allow passage of the cover plate over the head at a larger portion of the keyhole and to prevent passage of the cover plate across the head at another smaller portion of the keyhole.

10. In combination, a percussion instrument adapted to be played with mallets and a lid adapted to cover and conceal the upper portion of the instrument during storage and to, when desired, be inverted to receive the instrument and generally enclose the bottom thereof during use, the instrument comprising a generally hollow resonance chamber bounded by a rectangular peripheral edge frame and a top board with spaced diagonal frame members in contact with the board spanning between separate portions of the edge frame, each diagonal frame member having a depth less than the depth of the edge frame, the top board comprising a relatively thin member presenting a diagonal array of spaced apertures therein which open between the spaced diagonal members into the resonance chamber, the top surface of the board comprising musical indicia comprising a staff of lines extending side to side across the diagonal array of apertures, color-contrasting borders adjacent the staff lines and a representation of a piano keyboard substantially coextensive with the staff but spaced therefrom by one said border, two diagonal arrays of vertically-extending mounting pins surrounded by a vibration isolating material and anchored to the board and spaced from the diagonal apertures on opposite sides with a pin from each array being laterally aligned with each other and with an adjacent aperture of the diagonal array, a felt pad encircling each pin and resting upon the top surface of the board, a series of tuned sounding bars each superimposed over the board and over at least part of the staff and centrally surmounting one aperture of the diagonal array, each bar resting by gravity upon and bridging between spaced felt pads with one pin of each diagonal array projecting through an aperture in the adjacent bar to secure the bar against appreciable lateral movement so that vibrations of each bar pass through the surmounted aperture and resonate within the resonance chamber, each bar having indicia on the top surface comprising at least one staff line vertically superimposed directly over one staff line on the top surface of the board and a symbol of the note identifying the tone produced when the bar is sounded positioned in proper scale relation relative to the staff and in musical alignment with one key of the piano keyboard representation with the portion of some of the bars which are respectively superimposed over a given said border being colored comparable thereto and the portion of each bar superimposed over the staff being colored comparable thereto, selected bars having indicia on the reverse side and also displaying at least one staff line vertically aligned with one staff line on the board and a symbol of the note produced when the bar is sounded, scale related to the staff and aligned with a key of the piano keyboard representation.

11. A combination according to claim 10 wherein the pins of one array each comprise an enlarged head and further comprising a cover plate, of yieldable material having a retentive memory, adapted to fit over top of each sounding bar, each cover plate having two apertures to receive the two pins received by the adjacent bar, the aperture adapted to receive the pin with an enlarged head being in the shape of a keyhole so that the head will retain the cover plate over the bar when the narrow portion of the keyhole opening is beneath the head, the top surface of each cover plate presenting at least one staff line vertically aligned with one staff line on the top surface of the board, the portion of cover plate being superimposed over said some bars and over a given said border being colored comparable thereto and the portion of each cover plate superimposed over the staff being colored comparable thereto, the reverse surface of each cover plate presenting indicia comprising an indentification of the location of the cover plate in relation to the location of other cover plates and a letter designation of the note produced when the adjacent bar is uncovered and sounded.

References Cited

UNITED STATES PATENTS

| | | | |
|---|---|---|---|
| 484,589 | 10/1892 | Hanke et al. | 84—471 |
| 636,232 | 11/1899 | Anderson | 84—470 |
| 1,392,766 | 10/1921 | Huth | 84—470 |
| 2,943,527 | 7/1960 | Hanert | 84—403 |

RICHARD B. WILKINSON, Primary Examiner

LAWRENCE R. FRANKLIN, Assistant Examiner

U.S. Cl. X.R.

84—403